United States Patent
Jimenez

(10) Patent No.: US 11,965,577 B1
(45) Date of Patent: Apr. 23, 2024

(54) CENTRIFUGAL PENDULUM ABSORBER

(71) Applicant: Schaeffler Technologies AG & Co. KG, Herzogenaurach (DE)

(72) Inventor: Alfredo Perez Mitre Jimenez, Wooster, OH (US)

(73) Assignee: Schaeffler Technologies AG & Co., Herzogenaurach (DE)

( * ) Notice: Subject to any disclaimer, the term of this patent is extended or adjusted under 35 U.S.C. 154(b) by 0 days.

(21) Appl. No.: 18/080,813

(22) Filed: Dec. 14, 2022

(51) Int. Cl.
*F16F 15/14* (2006.01)

(52) U.S. Cl.
CPC ........ *F16F 15/145* (2013.01); *F16F 2222/08* (2013.01); *F16F 2232/02* (2013.01); *F16F 2236/08* (2013.01)

(58) Field of Classification Search
CPC .................................................. F16F 2236/08
See application file for complete search history.

(56) References Cited

FOREIGN PATENT DOCUMENTS

| FR | 3000157 A1 | * | 6/2014 | ............ F16F 15/145 |
| WO | WO-2018206036 A1 | * | 11/2018 | .......... F16F 15/1421 |

* cited by examiner

*Primary Examiner* — Vicky A Johnson

(57) ABSTRACT

A centrifugal pendulum absorber includes: a center plate arranged to receive a torque; a first pendulum connected to the center plate; and a second pendulum mass connected to the center plate and circumferentially aligned with the first pendulum mass. The first pendulum mass includes a first circumferential end and a first curved portion disposed at the first circumferential end. The second pendulum mass includes a second circumferential end disposed proximate to the first circumferential end and a second curved portion disposed at the second circumferential end. The first curved portion and the second curved portion are each convex relative to a first circumferential direction from the first circumferential end to the second circumferential end.

19 Claims, 6 Drawing Sheets

CENTRIFUGAL PENDULUM ABSORBER

TECHNICAL FIELD

The present disclosure relates generally to a centrifugal pendulum absorber, and more specifically to a pendulum mass of a centrifugal pendulum absorber.

BACKGROUND

A known centrifugal pendulum absorber includes resilient bumpers to soften contact between pendulum masses as the masses displace in reaction to rotation of the absorber. However, the absorber may be unable to prevent contact between the pendulum masses in cases of asynchronous movement between the pendulum masses. It is desirable to have alternative designs and configurations to reduce stress on the pendulum masses caused by impact loading during asynchronous movement between the pendulum masses.

SUMMARY

Embodiments of this disclosure provide a centrifugal pendulum absorber including a center plate arranged to receive a torque, a first pendulum connected to the center plate, a second pendulum mass connected to the center plate and circumferentially aligned with the first pendulum mass. The first pendulum mass includes a first circumferential end and a first curved portion disposed at the first circumferential end. The second pendulum mass includes a second circumferential end disposed proximate to the first circumferential end and a second curved portion disposed at the second circumferential end. The first curved portion and the second curved portion are each convex relative to a first circumferential direction from the first circumferential end to the second circumferential end In embodiments, the first pendulum mass and the second pendulum mass may be disposed on a same axial side of the center plate. In embodiments, the second curved portion may be configured to be received within the first curved portion during asynchronous movement between the first pendulum mass and the second pendulum mass. In embodiments, a radius of curvature of the first curved portion may be greater than a radius of curvature of the second curved portion.

In embodiments, the first pendulum mass may include a first outer portion extending radially outward from the first curved portion, and the second pendulum mass may include a second outer portion extending radially outward from the second curved portion. The second outer portion and the first outer portion may extend obliquely relative to each other. In embodiments, the first curved portion may be disposed radially outside of the center plate, and the second curved portion may be disposed radially outside of the center plate.

In embodiments, the first curved portion may extend from a radially outer end to a radially inner end. The radially inner end may be disposed radially outside of the center plate. The second curved portion may extend from a radially outer end to a radially inner end. The radially inner end of the second curved portion may be circumferentially aligned with the radially inner end of the first curved portion. The radially outer end of the second curved portion may be circumferentially aligned with the radially outer end of the first curved portion. The centrifugal pendulum absorber may include a fastener disposed proximate to the second end and radially between the radially outer end and the radially inner end of the second curved portion. The fastener may be configured to fixedly connect the second pendulum mass to a further pendulum mass axially aligned with the second pendulum mass. The centrifugal pendulum absorber may include a fastener disposed proximate to the first end and radially between the radially outer end and the radially inner end of the first curved portion. The fastener may be configured to fixedly connect the first pendulum mass to a further pendulum mass axially aligned with the first pendulum mass.

In embodiments, the first curved portion may be disposed proximate to the second curved portion. In embodiments, the first curved portion may include an apex spaced from the first circumferential end in a second, opposite circumferential direction. In embodiments, the second curved portion may include an apex spaced from the second circumferential end in the first circumferential direction.

Embodiments of this disclosure further provide a pendulum mass for a centrifugal pendulum absorber including a first circumferential end and a second circumferential end spaced from the first circumferential end. The pendulum mass further includes a first curved portion disposed at the first circumferential end. The pendulum mass further includes a second curved portion disposed at the second circumferential end. The first curved portion and the second curved portion are each convex relative to a first circumferential direction from the second circumferential end to the first circumferential end.

In embodiments, a radius of curvature of the first curved portion may be greater than a radius of curvature of the second curved portion. In embodiments, the pendulum mass may include a first outer portion extending radially outward from the first curved portion. The pendulum mass may further include a second outer portion extending radially outward from the second curved portion. The second outer portion and the first outer portion may extend obliquely relative to each other.

In embodiments, pendulum mass may include a first hole disposed proximate to the first circumferential end and circumferentially aligned with the first curved portion. The first hole may be configured to receive a fastener for fixedly connecting the pendulum mass to a further pendulum mass axially aligned with the pendulum mass. The pendulum mass may include a second hole disposed proximate to the second circumferential end and circumferentially aligned with the second curved portion. The second hole may be configured to receive a further fastener for fixedly connecting the pendulum mass to the further pendulum mass.

In embodiments, the first curved portion may be circumferentially aligned with the second curved portion.

DETAILED DESCRIPTION

Figure 1:
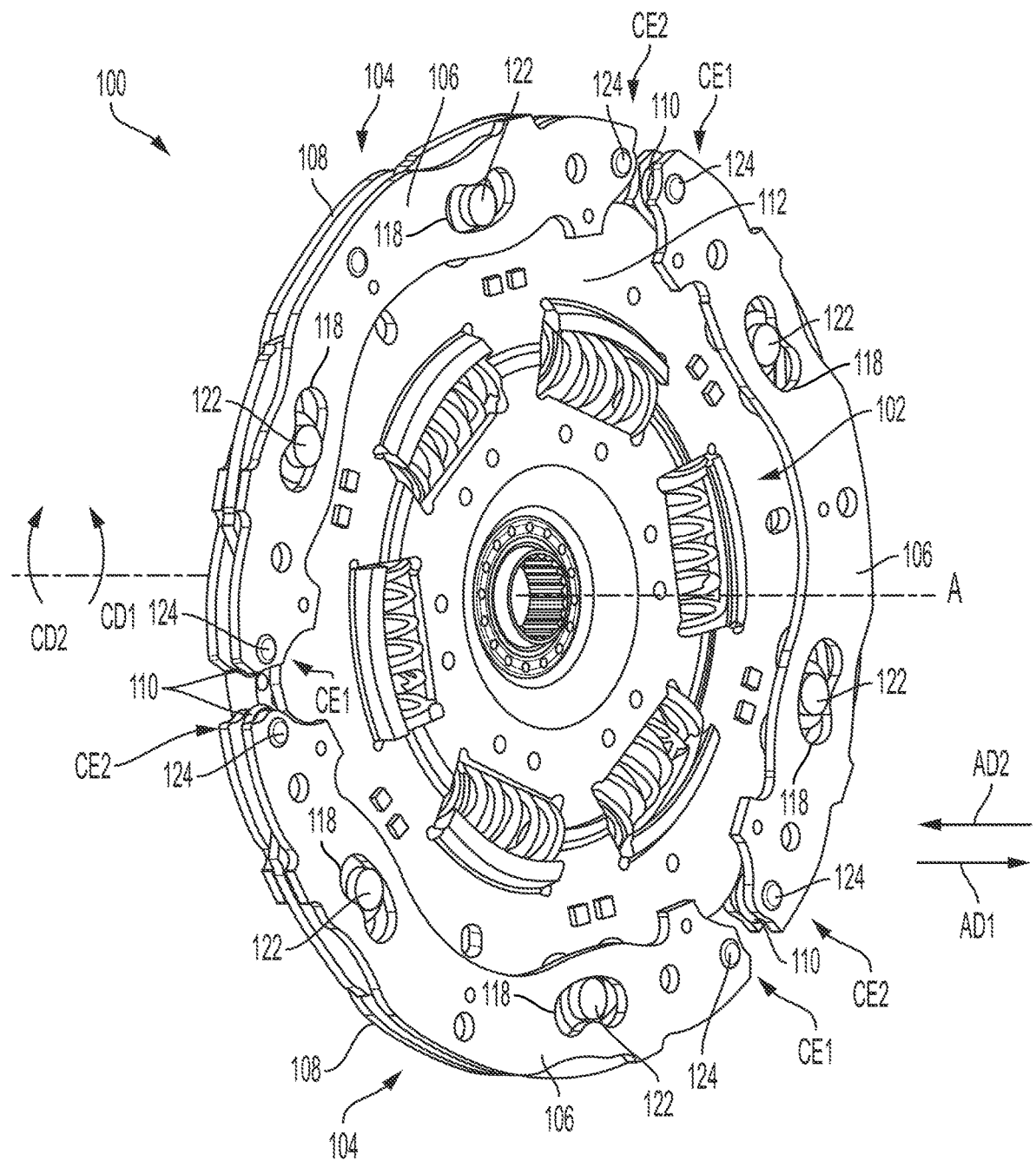
FIG. 1 illustrates a perspective view of a centrifugal pendulum absorber with a pendulum mass according to the present disclosure.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

A centrifugal pendulum absorber typically includes a first pendulum mass and a second pendulum mass circumferentially aligned with each other. Specifically, a circumferential end of the first pendulum mass may be proximate a circumferential end of the second pendulum mass, e.g., a line extending along a circumference about a central axis may pass through the circumferential end of the first pendulum mass, a gap disposed circumferentially between the pendulum masses, and then through the circumferential end of the second pendulum mass. In some centrifugal pendulum absorber arrangements, each of the first and second pendulum masses may include a curved portion disposed at the respective circumferential ends. Each curved portion may be convex relative to the gap, i.e., the curved portions may be curved in opposite directions relative to each other. In such arrangements, apexes of the curved portions may impact each other during asynchronous movement of the pendulum masses, which can increase a likelihood of damage to the pendulum masses.

Advantageously, embodiments described herein provide a centrifugal pendulum absorber that includes a center plate, a first pendulum mass connected to the center plate, and a second pendulum mass connected to the center plate and circumferentially aligned with the first pendulum mass. The pendulum masses each include respective circumferential ends disposed proximate to each other and respective curved portions disposed at the corresponding circumferential end. Each curved portion is convex relative to a first circumferential direction. Embodiments according to the present disclosure provide several advantages including increasing clearance between circumferentially adjacent pendulum masses, which can reduce a likelihood of the circumferentially adjacent pendulum masses impacting each other. Additionally, curving the curved portions on the proximate circumferential ends of circumferentially adjacent pendulum masses in a same direction can increase an effective contact area between the curved portions during an impact event, which can reduce impact stresses on the circumferentially adjacent pendulum masses. Thus, the durability and service life of pendulum masses are increased, contributing to an increase in the durability and service life of centrifugal pendulum absorber.

Figure 2:
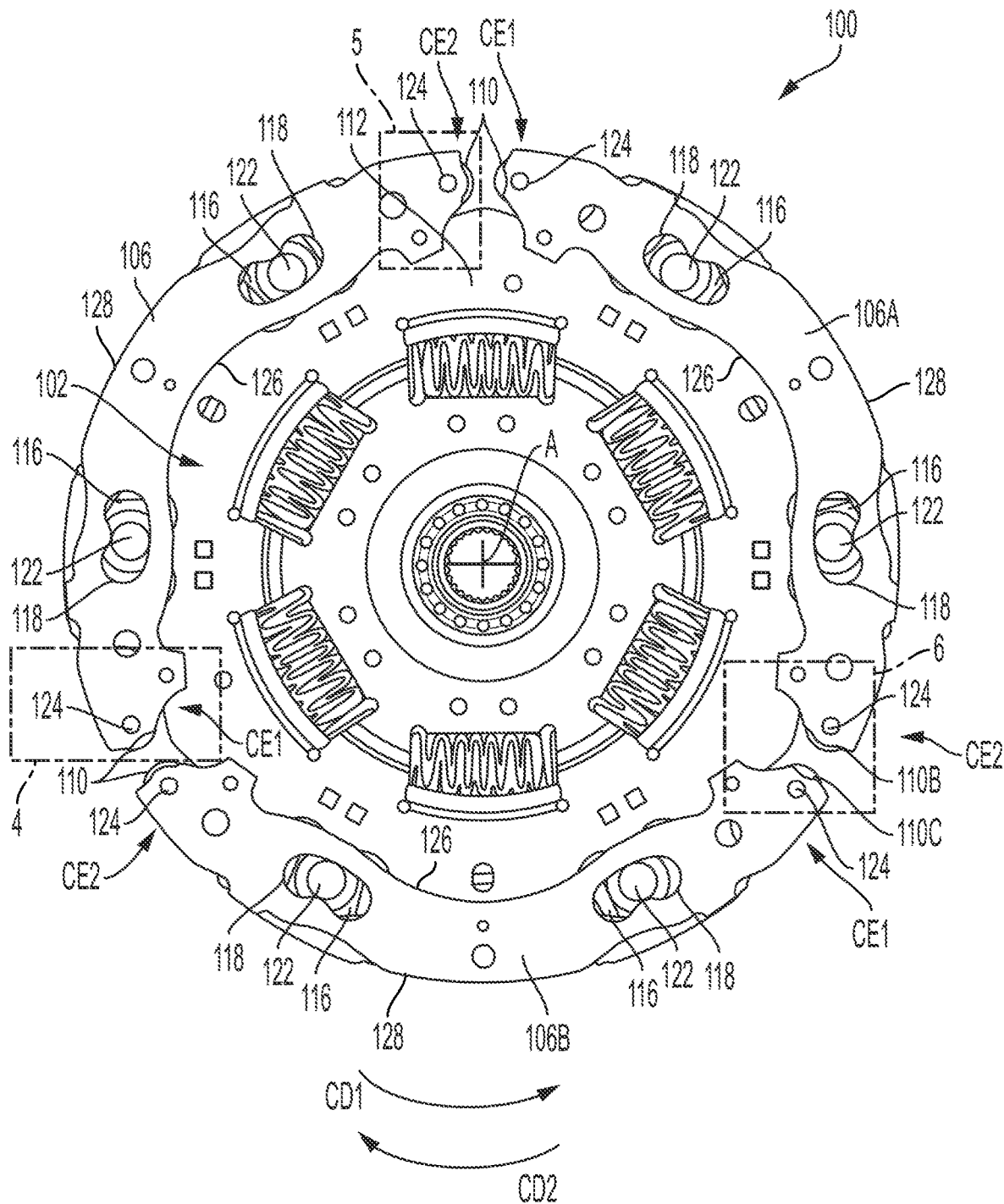
FIG. 2 illustrates a front view of the centrifugal pendulum absorber shown in FIG. 1.
Figure 3:
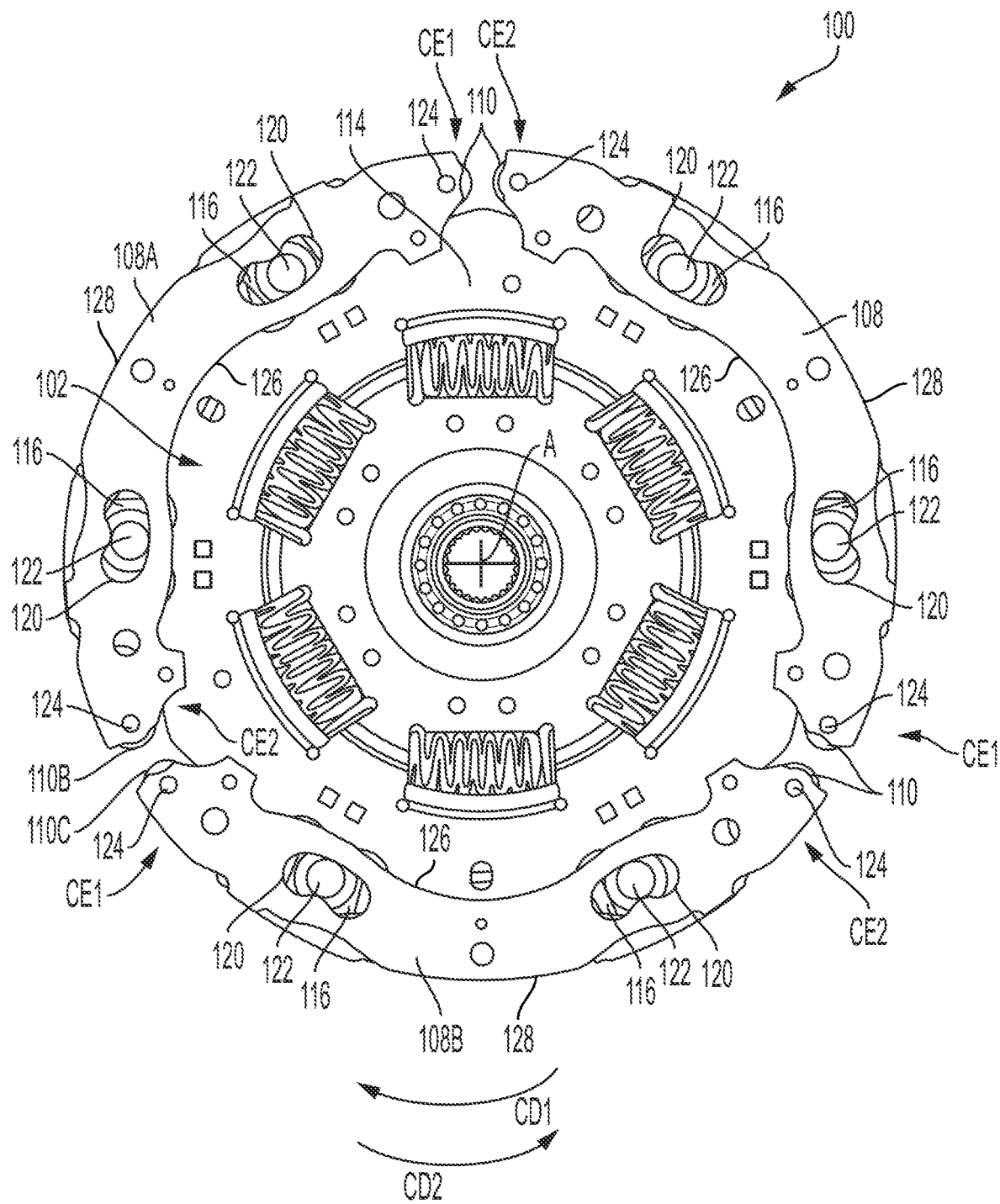
FIG. 3 illustrates a back view of the centrifugal pendulum absorber shown in FIG. 1.

Referring to FIGS. 1-3, a centrifugal pendulum absorber 100 is generally shown. At least some portions of the centrifugal pendulum absorber 100 are rotatable about an axis A. Words such as "axial," "radial," "circumferential," "outward," etc. as used herein are intended to be with respect to the axis A unless stated otherwise. The centrifugal pendulum absorber 100 includes: a center plate 102; pairs 104 of pendulum masses 106, 108; and resilient bumpers 110 connected to masses 106, 108.

The center plate 102 is arranged to receive a torque. The center plate 102 includes: a side 112 facing in an axial direction AD1 parallel to the axis A; and a side 114 facing in an axial direction AD2, opposite direction AD1. The pendulum masses 106 are disposed on the side 112 and the pendulum masses 108 are disposed on the side 114. That is, the pairs 104 axially bracket center plate 102. The center plate 102 may be a component of a vibration damper and include windows (not numbered) arranged to receive springs (not numbered).

The center plate 102 includes openings 116. Each mass 106 includes openings 118. Each mass 108 includes openings 120. The centrifugal pendulum absorber 100 includes rollers 122. Each roller 122 passes through a respective opening 116 and terminates in a respective opening 118 and a respective opening 120.

The centrifugal pendulum absorber 100 includes fasteners 124 non-rotatably connecting pairs 104 of masses 106, 108. Each resilient bumper 110 is installed and disposed around a respective fastener 124. Each resilient bumper 110 is rotatable about the respective fastener 124. That is, the resilient bumpers 110 are rotatable relative to the center plate 102. The resilient bumpers 110 are configured to reduce a likelihood of direct contact of the masses 106, 108 due to the displacement of the circumferentially adjacent pairs 104 toward each other.

Each mass 106, 108 extends partially circumferentially about the central axis A from a first circumferential end CE1 to a second circumferential end CE2. The masses 106, 108 are circumferentially aligned with each other such that the first circumferential end CE1 of one mass 106, 108 is disposed proximate to the second circumferential end CE2 of another, circumferentially adjacent mass 106, 108.

Each pair 104 includes two resilient bumpers 110. One of the two resilient bumpers 110 is located proximate to the first circumferential ends CE1 of the masses 106, 108 in the pair 104 and extends past the pair 104 in a first circumferential direction CD1. The other of the two resilient bumpers 110 is located proximate to the second circumferential ends CE2 of the masses 106, 108 in the pair 104 and extends past the pair 104 in a second circumferential direction CD2, opposite the first circumferential direction CD1.

Each mass 106, 108 may include an inner surface 126 and an outer surface 128 disposed radially outside of the inner surface 126. Each inner surface 126 may extend from the first circumferential end CE1 of the respective mass 106, 108 to the second circumferential end CE2 of the respective mass 106, 108. Each outer surface 128 may extend from the first circumferential end CE1 of the respective mass 106, 108 to the second circumferential end CE2 of the respective mass 106, 108.

Figure 4:
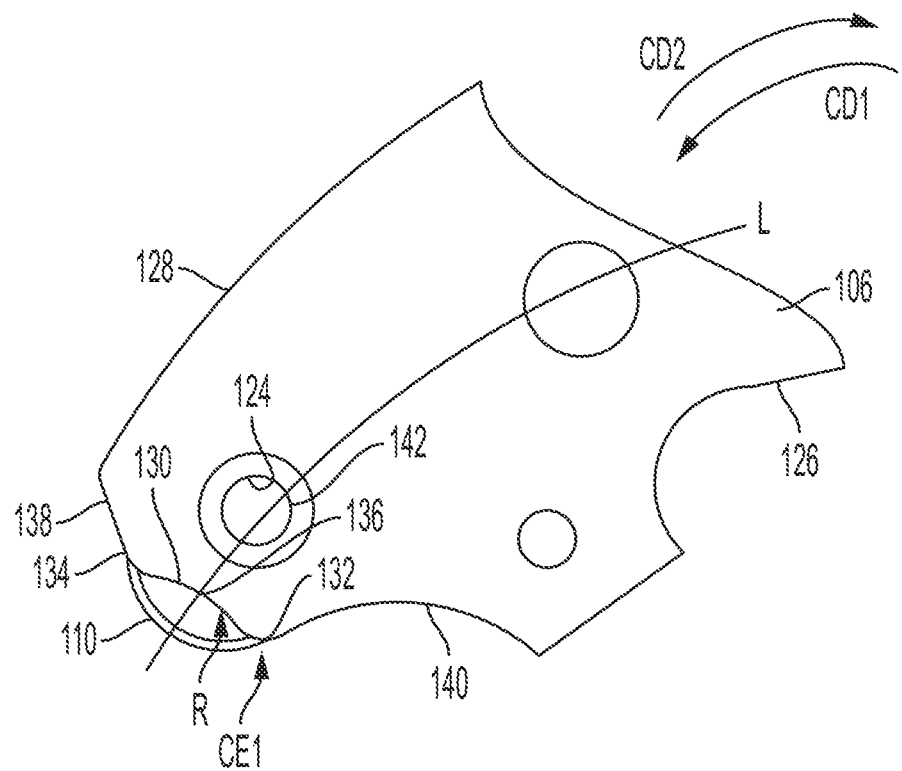
FIG. 4 illustrates an enlarged view of an area of the pendulum mass shown in FIG. 2.

Referring to FIG. 4, each mass 106, 108 includes a first curved portion 130 disposed at the first circumferential end CE1. Each first curved portion 130 may be disposed radially outside of the center plate 102. Each first curved portion 130 may include a radially inner end 132 and a radially outer end 134 disposed radially outside of the radially inner end 132. Each radially inner end 132 may be disposed radially outside of the corresponding inner surface 126 of the respective mass 106, 108. Each radially outer 134 end may be disposed radially inside of the corresponding outer surface 128 of the respective mass 106, 108.

Each first curved portion 130 is convex relative to a line L extending through the respective mass 106, 108, e.g., the circumferential ends CE1, CE2 thereof, in the first circumferential direction CD1. That is, each first curved portion 130 is curved about a respective center spaced from the corresponding first circumferential end CE1 of the respective mass 106, 108 in the first circumferential direction CD1. Said differently, each first curved portion 130 includes an apex 136 spaced from the corresponding radially inner and radially outer ends 132, 134 of the respective first curved portion 130 in the second circumferential direction CD2.

Each mass 106, 108 may further include a first outer portion 138 disposed at the first circumferential end CE1. Each first outer portion 138 may extend radially inward from the corresponding outer surface 128 of the respective mass 106, 108 to the corresponding first curved portion 130, e.g., the radially outer end 134 thereof, of the respective mass 106, 108. Each first outer portion 138 may, for example, extend in the first circumferential direction CD1 to the corresponding first curved portion 130. That is, each radially outer end 134 of the corresponding first curved portions 130 may be spaced from the corresponding outer surface 128 of the respective mass 106, 108 in the first circumferential direction CD1.

Each mass 106, 108 may further include a first inner portion 140 disposed at the first circumferential end CE1. Each first inner portion 140 may extend radially outward from the corresponding inner surface 126 of the respective mass 106, 108 to the corresponding first curved portion 130, e.g., the radially inner end 132 thereof, of the respective mass 106, 108. Each first inner portion 140 may, for example, extend in the first circumferential direction CD1 to the corresponding first curved portion 130. That is, each radially inner end 132 of the corresponding first curved portions 130 may be spaced from the corresponding inner surface 126 of the respective mass 106, 108 in the first circumferential direction CD1.

Each first inner portion 140 may include a curved segment (not numbered) extending from the corresponding inner surface 126 towards the corresponding first curved portion 130 of the respective mass 106, 108. For example, each first inner portion 140 may be convex relative to a line (not shown) extending through the respective first inner portion 140 in the first circumferential direction CD1. As one example, the curved segment of the first inner portion 140 may extend to the first curved portion 130. As another example, the first inner portion 140 may include a radial segment (not numbered) extending radially inward from the first curved portion 130 to the curved segment.

Each mass 106, 108 may further include a first hole 142 disposed proximate to the first circumferential end CE1. The first hole 142 on one mass 106 in a pair 104 is axially aligned with the first hole 142 on the other mass 108 in the pair 104. The first holes 142 are configured to receive the fasteners 124. Each first hole 142 may be, at least partially, circumferentially aligned with the corresponding first curved portion 130 of the respective mass 106, 108. That is, the line L may pass through, in order, the first hole 142, e.g., a portion thereof, and the first curved portion 130. For example, each first hole 142 may be disposed radially between the radially inner end 132 and the radially outer end 134 of the corresponding first curved portion 130 of the respective mass 106, 108.

Figure 5:
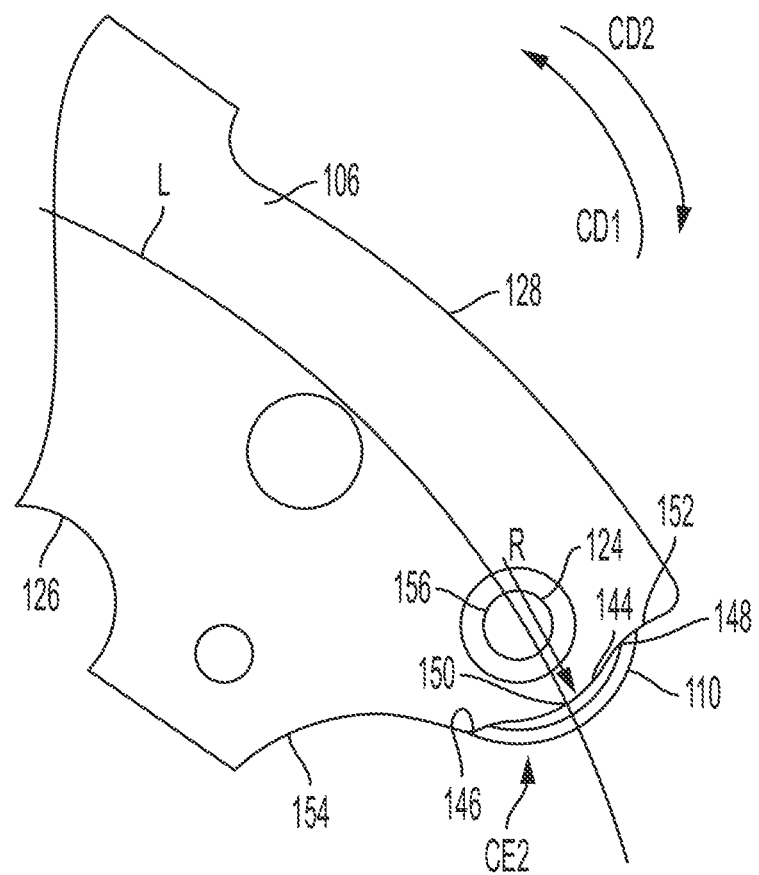
FIG. 5 illustrates an enlarged view of another area of the pendulum mass shown in FIG. 2.

Referring to FIG. 5, each mass 106, 108 includes a second curved portion 144 disposed at the second circumferential end CE2. Each second curved portion 144 may be disposed radially outside of the center plate 102. Each second curved portion 144 may include a radially inner end 146 and a radially outer end 148 disposed radially outside of the radially inner end 146. Each radially inner end 146 may be disposed radially outside of the corresponding inner surface 126 of the respective mass 106, 108. Each radially outer end 148 may be disposed radially inside of the corresponding outer surface 128 of the respective mass 106, 108.

Each second curved portion 144 is convex relative to the line L. That is, each second curved portion 144 is curved about a respective center spaced from the corresponding second circumferential end CE2 of the respective mass 106, 108 in the first circumferential direction CD1. Said differently, each second curved portion 144 includes an apex 150 spaced from the corresponding radially inner and radially outer ends 146, 148 of the respective second curved portion 144 in the second circumferential direction CD2.

Each mass 106, 108 may further include a second outer portion 152 disposed at the second circumferential end CE2. Each second outer portion 152 may extend radially inward from the corresponding outer surface 128 of the respective mass 106, 108 to the corresponding second curved portion 144, e.g., the radially outer end 148 thereof, of the respective mass 106, 108. As one example, each second outer portion 152 may extend obliquely relative to the corresponding first outer portion 138 of the respective mass 106, 108. For example, each second outer portion 152 may extend radially inward to the corresponding second curved portion 144 such that each radially outer end 148 of the corresponding second curved portions 144 may be radially aligned with an end of the corresponding outer surface 128 of the respective mass 106, 108.

Each mass 106, 108 may further include a second inner portion 154 disposed at the second circumferential end CE2. Each second inner portion 154 may extend radially outward from the corresponding inner surface 126 of the respective mass 106, 108 to the corresponding second curved portion 144, e.g., the radially inner end 146 thereof, of the respective mass 106, 108. Each second inner portion 154 may, for example, extend in the second circumferential direction CD2 to the corresponding second curved portion 144. That is, each radially inner end 146 of the corresponding second curved portions 144 may be spaced from the corresponding inner surface 126 of the respective mass 106, 108 in the second circumferential direction CD2.

Each second inner portion 154 may include a curved segment (not numbered) extending from the corresponding inner surface 126 towards the corresponding second curved portion 144 of the respective mass 106, 108. For example, each second inner portion 154 may be convex relative to a line (not shown) extending through the respective second inner portion 154 in the second circumferential direction CD2. As one example, the curved segment of the second inner portion 154 may extend to the second curved portion 144. As another example, the second inner portion 154 may include a radial segment (not numbered) extending radially inward from the second curved portion 144 to the curved segment.

Figure 6:
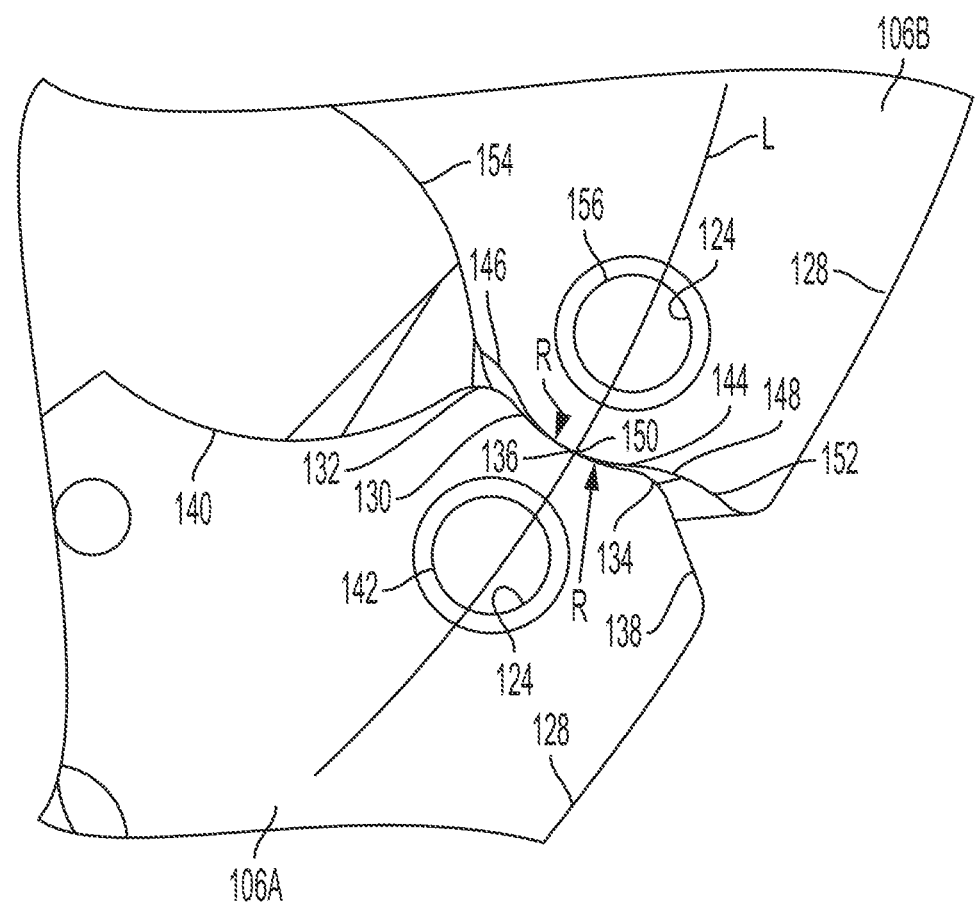
FIG. 6 illustrates an enlarged view of an area of the centrifugal pendulum absorber shown in FIG. 1.

Each mass 106, 108 may further include a second hole 156 disposed proximate to the second circumferential end CE2, as shown in FIG. 6. The second hole 156 on one mass 106 in a pair 104 is axially aligned with the second hole 156 on the other mass 108 in the pair 104. The second holes 156 are configured to receive the fasteners 124. Each second hole 156 may be, at least partially, circumferentially aligned with the second curved portion 144. For example, each second hole 156 may be disposed radially between the radially inner end 146 and the radially outer end 148 of the corresponding second curved portion 144 of the respective mass 106, 108.

Referring to FIG. 6, each first curved portion 130 may be configured to receive the corresponding second curved portion 144 of a circumferentially adjacent mass 106, 108. For example, the radially inner end 132 of each first curved portion 130 may be circumferentially aligned with the radially inner end 146 of the corresponding second curved portion 144 of the circumferentially adjacent mass 106, 108. Additionally, or alternatively, the radially outer end 132 of each first curved portion 130 may be circumferentially aligned with the radially outer end 148 of the corresponding second curved portion 144 of the circumferentially adjacent mass 106, 108.

A radius of curvature R of the first curved portion 130 may be greater than a radius of curvature R of the second curved portion 144. Providing the first curved portion 130 with a larger radius of curvature than the second curved portion 144 permits the apex 150 of the second curved portion 144 to be circumferentially displaced between the radially inner and outer ends 132, 134 of the first curved portion 130, which can increase clearance between each first curved portion 130 and the corresponding second curved portion 144 on the circumferentially adjacent mass 106, 108.

FIG. 6 is applicable to a condition in which pairs 104 are subject to asynchronous movement therebetween. In reaction to rotation of the center plate 102, the configuration of the rollers 122 in the openings 116, 118, and 120, enables radial and circumferential displacement of the masses 106, 108, with respect to the center plate 102, to absorb vibration associated with the rotation of the center plate 102. At times, the radial and circumferential displacement causes asynchronous movements between circumferentially adjacent pairs 104 of masses 106, 108, i.e., the circumferentially adjacent pairs 104 of masses 106, 108 displace toward each other. In such an example, the first curved portions 130 of masses 106A, 108A may receive the corresponding second curved portions 144 of masses 106B, 108B. That is, each apex 150 of the corresponding second curved portions 144 may be displaced circumferentially between the corresponding radially inner and outer ends 132, 134 of the respective first curved portion 130. In the discussion above and in the discussion that follows, capital letters are used to designate a specific component from a group of components otherwise designated by a three-digit number, for example, mass 106A is a specific example from among masses 106.

In some situations, the resilient bumpers 110 may be unable to absorb impact forces between the pairs 104 of masses 106, 108. In these situations, each second curved portion 144 may contact the corresponding first curved portion 130 for the circumferentially adjacent mass 106, 108, as shown in FIG. 6. In such an example, a contact area between each second curved portion 144 and the corresponding first curved portion 130 corresponds to an arc of the respective second curved portion 144 that has a same radius of curvature as an arc of the respective first curved portion 130.

By providing, on proximate circumferential ends of circumferentially adjacent pendulum masses, curved portions that are each curved in a same direction relative to each other, the embodiments disclosed herein can increase a contact area between the circumferentially adjacent pendulum masses. For example, the contact area may be defined by corresponding arcs of the curved portions having similar radii of curvature as opposed to the apexes of the curved portions. This increase in the contact area can decrease stress from an impact between the curved portions caused by asynchronous movement between circumferentially adjacent pendulum masses. Additionally, the curved portions according to the exemplary embodiments disclosed herein can increase a clearance between the proximate circumferential ends of the circumferentially adjacent pendulum masses, which can decrease a likelihood of the circumferentially adjacent pendulum masses impact each other during asynchronous movement between the pendulum masses.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A centrifugal pendulum absorber, comprising:
   a center plate arranged to receive a torque;
   a first pendulum mass connected to the center plate, the first pendulum mass including:
      a first circumferential end; and
      a first curved portion disposed at the first circumferential end; and
   a second pendulum mass connected to the center plate and circumferentially aligned with the first pendulum mass, the second pendulum mass including:
      a second circumferential end disposed proximate to the first circumferential end; and
      a second curved portion disposed at the second circumferential end; wherein the first curved portion and the second curved portion are each convex relative to a first circumferential direction from the first circumferential end to the second circumferential end;
   wherein the first curved portion extends from a radially outer end to a radially inner end, the radially inner end being disposed radially outside of the center plate.

2. The centrifugal pendulum absorber of claim 1, wherein the first pendulum mass and the second pendulum mass are disposed on a same axial side of the center plate.

3. The centrifugal pendulum absorber of claim 1, wherein the second curved portion is configured to be received within the first curved portion during asynchronous movement between the first pendulum mass and the second pendulum mass.

4. The centrifugal pendulum absorber of claim 1, wherein a radius of curvature of the first curved portion is greater than a radius of curvature of the second curved portion.

5. The centrifugal pendulum absorber of claim 1, wherein the first pendulum mass includes a first outer portion extending radially outward from the first curved portion, and the second pendulum mass includes a second outer portion extending radially outward from the second curved portion, the second outer portion and the first outer portion extending obliquely relative to each other.

6. The centrifugal pendulum absorber of claim 1, wherein the second curved portion is disposed radially outside of the center plate.

7. The centrifugal pendulum absorber of claim 1, wherein the second curved portion extends from a radially outer end to a radially inner end, the radially inner end of the second curved portion being circumferentially aligned with the radially inner end of the first curved portion.

8. The centrifugal pendulum absorber of claim 7, wherein the radially outer end of the second curved portion is circumferentially aligned with the radially outer end of the first curved portion.

9. The centrifugal pendulum absorber of claim 7, further comprising a fastener disposed proximate to the second end and radially between the radially outer end and the radially inner end of the second curved portion, wherein the fastener is configured to fixedly connect the second pendulum mass to a further pendulum mass axially aligned with the second pendulum mass.

10. The centrifugal pendulum absorber of claim 1, further comprising a fastener disposed proximate to the first end and radially between the radially outer end and the radially inner end of the first curved portion, wherein the fastener is configured to fixedly connect the first pendulum mass to a further pendulum mass axially aligned with the first pendulum mass.

11. The centrifugal pendulum absorber of claim 1, wherein the first curved portion is disposed proximate to the second curved portion.

12. The centrifugal pendulum absorber of claim 1, wherein the first curved portion includes an apex spaced from the first circumferential end in a second, opposite circumferential direction.

13. The centrifugal pendulum absorber of claim 1, wherein the second curved portion includes an apex spaced from the second circumferential end in the first circumferential direction.

14. A pendulum mass for a centrifugal pendulum absorber, comprising:
a first circumferential end and a second circumferential end spaced from the first circumferential end;
a first curved portion disposed at the first circumferential end;
a second curved portion disposed at the second circumferential end; and
a first hole disposed proximate to the first circumferential end and circumferentially aligned with the first curved portion, the first hole being configured to receive a fastener for fixedly connecting the pendulum mass to a further pendulum mass axially aligned with the pendulum mass;
wherein the first curved portion and the second curved portion are each convex relative to a first circumferential direction from the second circumferential end to the first circumferential end.

15. The pendulum mass of claim 14, wherein a radius of curvature of the first curved portion is greater than a radius of curvature of the second curved portion.

16. The pendulum mass of claim 14, further comprising:
a first outer portion extending radially outward from the first curved portion; and a second outer portion extending radially outward from the second curved portion, the second outer portion and the first outer portion extending obliquely relative to each other.

17. The pendulum mass of claim 14, further comprising a second hole disposed proximate to the second circumferential end and circumferentially aligned with the second curved portion, the second hole being configured to receive a further fastener for fixedly connecting the pendulum mass to the further pendulum mass.

18. The pendulum mass of claim 14, wherein the first curved portion is circumferentially aligned with the second curved portion.

19. A pendulum mass for a centrifugal pendulum absorber, comprising:
a first circumferential end and a second circumferential end spaced from the first circumferential end;
a first curved portion disposed at the first circumferential end; and
a second curved portion disposed at the second circumferential end;
wherein the first curved portion and the second curved portion are each convex relative to a first circumferential direction from the second circumferential end to the first circumferential end;
wherein a radius of curvature of the first curved portion is greater than a radius of curvature of the second curved portion.

* * * * *